United States Patent
Jung et al.

(10) Patent No.: US 10,486,983 B2
(45) Date of Patent: Nov. 26, 2019

(54) VANADIUM RECOVERY METHOD

(71) Applicant: Worcester Polytechnic Institute, Worcester, MA (US)

(72) Inventors: Myungwon Jung, Worcester, MA (US); Brajendra Mishra, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 15/916,668

(22) Filed: Mar. 9, 2018

(65) Prior Publication Data

US 2018/0297856 A1 Oct. 18, 2018

Related U.S. Application Data

(60) Provisional application No. 62/469,261, filed on Mar. 9, 2017.

(51) Int. Cl.
| | |
|---|---|
| *C01G 31/00* | (2006.01) |
| *C01G 31/02* | (2006.01) |
| *C22B 5/10* | (2006.01) |
| *C22B 34/22* | (2006.01) |
| *C22B 1/02* | (2006.01) |
| *C22B 1/08* | (2006.01) |
| *C22B 3/44* | (2006.01) |
| *C22B 7/00* | (2006.01) |
| *C22B 7/02* | (2006.01) |

(52) U.S. Cl.
CPC ............ *C01G 31/02* (2013.01); *C22B 1/02* (2013.01); *C22B 1/08* (2013.01); *C22B 3/44* (2013.01); *C22B 5/10* (2013.01); *C22B 7/006* (2013.01); *C22B 7/02* (2013.01); *C22B 34/22* (2013.01); *Y02P 10/234* (2015.11)

(58) Field of Classification Search
CPC .......... C01G 31/02; C22B 5/10; C22B 34/22; C22B 1/02; C22B 1/08; C22B 3/44; C22B 7/006; C22B 7/02; Y02P 10/234
See application file for complete search history.

(56) References Cited

U.S. PATENT DOCUMENTS

| | | | | |
|---|---|---|---|---|
| 4,115,110 A | * | 9/1978 | Pyrih | C22B 34/22 423/508 |
| 4,389,378 A | | 6/1983 | McCorriston | |
| 4,472,360 A | | 9/1984 | McCorriston | |
| 4,477,416 A | * | 10/1984 | Goddard | C22B 34/22 423/62 |
| 4,536,374 A | | 8/1985 | McCorriston | |
| 4,645,651 A | | 2/1987 | Hahn et al. | |
| 4,748,009 A | * | 5/1988 | Hahn | C22B 34/22 423/68 |
| 4,798,709 A | * | 1/1989 | Lakshmanan | C01B 39/02 209/10 |
| 4,816,236 A | | 3/1989 | Gardner | |
| 8,277,766 B2 | * | 10/2012 | Hnat | C01G 31/02 423/62 |

OTHER PUBLICATIONS

Stas, et al., "Extraction and separation of molybdenum and vandium from alkaline leaching" Oct. 10, 2009, pp. 87-93, Periodica Polytechnica. Chemical Engineering 54/2, 87.
Holloway, et al., "Salt Roasting of Suncor Oil Sands Fly Ash", Metallurgical and Materials Transactions B, vol. 35B, Dec. 2004, pp. 1051-1058.

* cited by examiner

*Primary Examiner* — Steven J Bos
(74) *Attorney, Agent, or Firm* — Armis IP Law, LLC

(57) ABSTRACT

A vanadium recovery approach utilizes oil fly ash (OFA), in contrast to coal fly ash, for separation and recovery of vanadium. OFA is first carbon burned to reduce the volume for recycling, and also to provide a fuel for other industrial processes. Following an almost 90% weight reduction from carbon burning, the remaining material includes about 18% vanadium. A salt roasting performed at the same temperature (about 650° C.) as the carbon burning allows use of the same oven or furnace, reducing heat requirements for the overall process. Salt roasting generates a water-soluble material from which a water leaching process yields a vanadium leach solution containing recovered vanadium, avoiding a need for caustic or volatile leaching agents. Ammonium metavanadate is precipitated from the vanadium leach solution through addition of ammonium sulfate, and a calcination process used to generate vanadium oxide ($V_2O_5$).

11 Claims, 3 Drawing Sheets

VANADIUM RECOVERY METHOD

RELATED APPLICATIONS

This application claims the benefit under 35 U.S.C. § 119(e) of U.S. Provisional Patent Application No. 62/469,261, filed Mar. 9, 2017, entitled "VANADIUM RECOVERY METHOD," incorporated herein by reference in entirety.

STATEMENT OF FEDERALLY SPONSORED RESEARCH AND DEVELOPMENT

Material disclosed herein was developed, in whole or in part, with Federal sponsorship under contract No. NSF I/UCRC 1464560, awarded by the National Science Foundation.

BACKGROUND

Vanadium is an important by-product that is used almost exclusively in ferrous and non-ferrous alloys due to its physical properties such as high tensile strength, hardness, and fatigue resistance. Vanadium consumption in the iron and steel industry represents about 85% of the vanadium-bearing products produced worldwide. The ubiquitous vanadium is employed in a wide range of alloys in combination with iron, titanium, nickel, aluminum, chromium, and other metals for a diverse range of commercial applications extending from train rails, tool steels, catalysts, to aerospace. The global supply of vanadium originates from primary sources such as ore feedstock, concentrates, metallurgical slags, and petroleum residues. Vanadium-bearing host minerals consist of carnotite, mottramite, patronite, roscoelite, and vanadinite. Deposits of titaniferous magnetite, uraniferous sandstone, bauxite, phosphate rock, crude oils, oil shale and tar sands host vanadium. Apart from titanomagnetite and ilmenite ore deposits containing vanadium, slags from the ferrous industry are a major source of supply.

Several properties of vanadium including high melting point, low density, and relatively high strength, make vanadium a valuable metal in several industries, including steel, aerospace, chemical and battery. Previous studies have indicated that about 90% of vanadium consumption comes from steel applications, as adding less than 1% of vanadium to steel increases its tensile strength and high-temperature strength. In the aerospace industry, vanadium is used as an alloying element for titanium alloys due to its high strength to weight ratio. For example, Ti-6Al-4V titanium alloy is widely used since it shows high strength, good toughness, and high temperature stability. In the chemical industry, vanadium pentoxide is often used as a catalyst, such as sulfuric acid production and selective catalytic reduction of NOx in power plants. A vanadium redox battery is another industrial application of vanadium since it can exist in solution as four oxidation states. A vanadium redox battery is a type of rechargeable battery which has extremely large capacities, and vanadium redox batteries may also be completely discharged without ill effects. Therefore, it is ideal for use in wind or solar energy storages.

SUMMARY

A vanadium recovery approach utilizes oil fly ash (OFA), in contrast to coal fly ash, for separation and recovery of vanadium. OFA is first carbon burned to reduce the volume for recycling, and also to provide a fuel for other industrial processes. Following an almost 90% weight reduction from carbon burning, the remaining material includes about 18% vanadium. A salt roasting performed at the same temperature (about 650° C.) as the carbon burning allows use of the same oven or furnace, reducing heat requirements for the overall process. Salt roasting generates a water-soluble material from which a water leaching process yields a vanadium leach solution containing recovered vanadium, avoiding a need for caustic or volatile leaching agents. Ammonium metavanadate is precipitated from the vanadium leach solution through addition of ammonium sulfate, and a calcination process used to generate vanadium oxide ($V_2O_5$).

Vanadium can be extracted from primary sources or secondary sources. Currently, titaniferous magnetite ores which contain about 1~1.5% of vanadium are a significant source of extractable vanadium. During the steel making process, vanadium rich slag is co-produced from titaniferous magnetite, useable as a source of vanadium. Additionally, refining or burning the energy sources which contain vanadium also results in vanadium bearing sources, such as ash, slag, spent catalysts, or residue. These materials can be processed for vanadium recovery as disclosed herein. Vanadium in various sources is processed to generate vanadium concentrated product. Then, vanadium from concentrates is extracted by salt-roasting followed by leaching. During salt-roasting process, vanadium oxides are roasted with sodium carbonate or sodium chloride and converted to sodium meta-vanadate.

Since sodium meta-vanadate is readily water soluble, it can be separated from gangue materials by leaching. Subsequently, a solution purification step, such as solvent extraction or ion exchange, may be included to purify vanadium bearing solution before the precipitation. Finally, vanadium pentoxide is precipitated out from the substantially pure vanadium solution. During precipitation, ammonium sulfate is added to precipitate ammonium meta-vanadate from the solution, and the reaction equation is as follows:

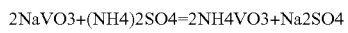

$$2NaVO_3 + (NH_4)_2SO_4 = 2NH_4VO_3 + Na_2SO_4$$

Once ammonium meta-vanadate is precipitated, the precipitates is filtered, dried, and calcined to vanadium pentoxide.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example sequence for recovering vanadium from oil fly ash (OFA) as disclosed in configurations herein. Fly ash has traditionally been handled as a waste material, often buried in landfills or even more stringently contained, due to the potential for groundwater contamination. Conventional fly ash results from coal burning, particularly in electrical plants, and contains little vanadium. Coal fly ash may be used as an inexpensive alternative to Portland cement in concrete production, but is generally regarded as a waste material. Oil fly ash, in contrast, results from oil burning electrical plants and has substantially more vanadium, which is extracted by the approach herein.

Vanadium has substantial industrial uses, particularly in metal refining and processing, and is extracted from mined ores similar to other ingredients of processed metals (e.g. iron, copper, carbon, etc.). The disclosed approach results in vanadium oxide having a purity comparable to conventional processing of mined vanadium, at around 95%.

Figure 1:
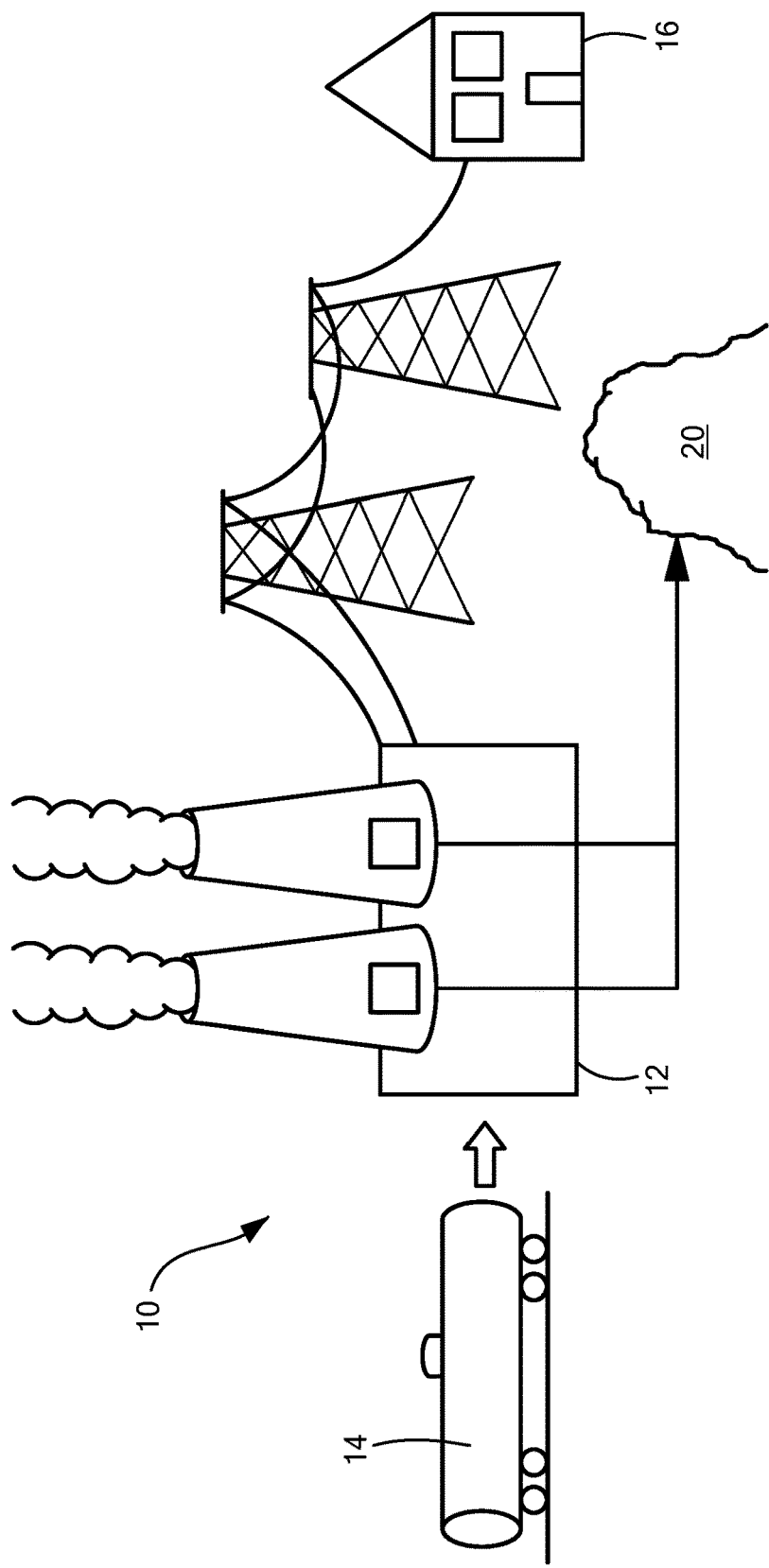
FIG. 1 is a context diagram of an OFA gathering and collecting environment.

In the approach depicted herein, FIG. 1 is a context diagram of an OFA gathering and collecting environment. Referring to FIG. 1, in an OFA producing environment 10, an electrical generating plant 12 is fueled by oil 14 for generating electricity to supply homes 16 and business. Combustion of the oil generates OFA 20 as a residual powder, which tends to settle in the combustion area and is extracted as a combustion waste. OFA 20, in contrast to coal fly ash, is employed in the recovery process disclosed herein.

Figure 2:
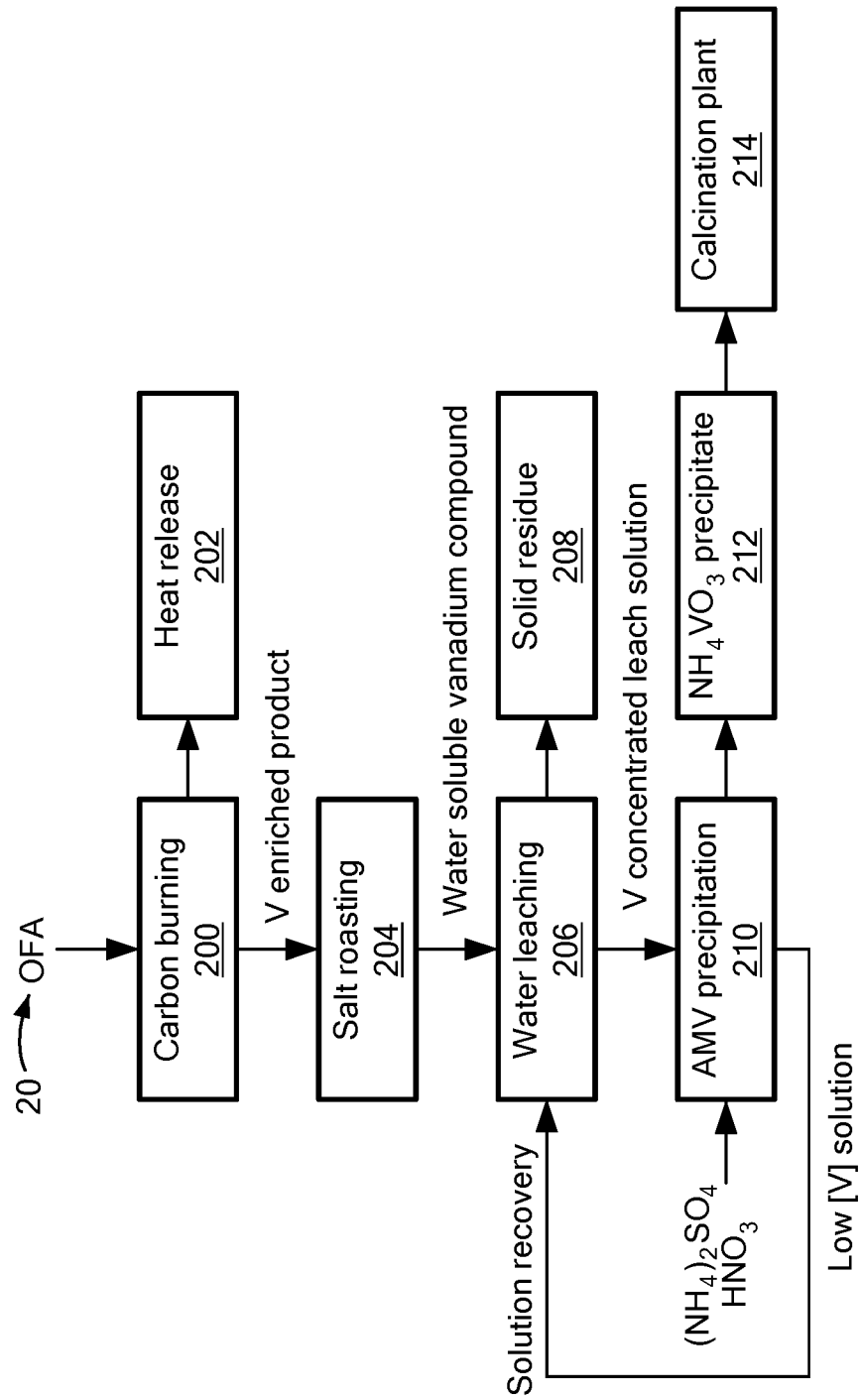
FIG. 2 is a progression of materials in the oil fly ash (OFA) recovery approach suitable for use in the environment of FIG. 1.

FIG. 2 is a progression of materials in the oil fly ash (OFA) recovery approach suitable for use in the environment of FIG. 1. Oil fly ash is recovered as a by-product from industrial oil combustion. Referring to FIG. 2, the OFA 20 results from extracting a fly-ash containing material from an industrial combustion process such as in oil-fired electrical generation plants. The extracted OFA contains sufficient carbon to provide fuel for other industrial processes, and is used for carbon burning at step 200 both for heat release at step 202 and to result in a residual vanadium enriched product. Carbon burning the extracted material for impurity removal and heat recovery leads into salt roasting the extracted material at step 204.

Salt roasting further includes adding sodium carbonate to the extracted material following the carbon burning, and salt roasting the extracted material with the sodium carbonate to generate a water-soluble leach product. Roasting may generally be described as a pyrochemical process in which the ore is heated in the presence of oxygen or air below its melting point, and may be performed in a reverberatory furnace. Since salt roasting may occur at the same or similar temperatures as the carbon burning (about 650° C.), it may occur in the same vessel and/or furnace. Salt roasting includes adding a salt such as sodium carbonate. Although sodium chloride would function, it produces harmful byproducts such as hydrochloric acid and chlorine gas. During the salt-roasting process, vanadium oxides are roasted with sodium carbonate or sodium chloride and converted to sodium meta-vanadate. In the example configuration, salt roasting results in at least one of $NaVO_3$ and $Na_2V_2O_7$. Several reaction equations defining the salt roasting are as follows:

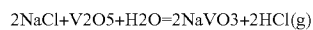

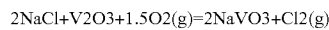

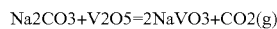

Water is added for leaching the salt-roasted material to produce a vanadium leach solution, at step 206, leaving behind a solid residue 208. The salt roasting forms water soluble vanadium products, and is followed by leaching the salt roasted material with water ($H_2O$) to result in the vanadium leach solution. Leaching vanadium results in a vanadium leach solution having at least a 90% purity. The leach solution contains the dissolved vanadium, which is recovered by precipitating ammonium metavanadate from the vanadium leach solution at step 210.

The result of precipitation, therefore, is ammonium metavanadate precipitate, as depicted at step 212. Calcining the precipitated ammonium metavanadate yields recovered vanadium in the form of vanadium pentoxide, as disclosed at step 214.

Figure 3:
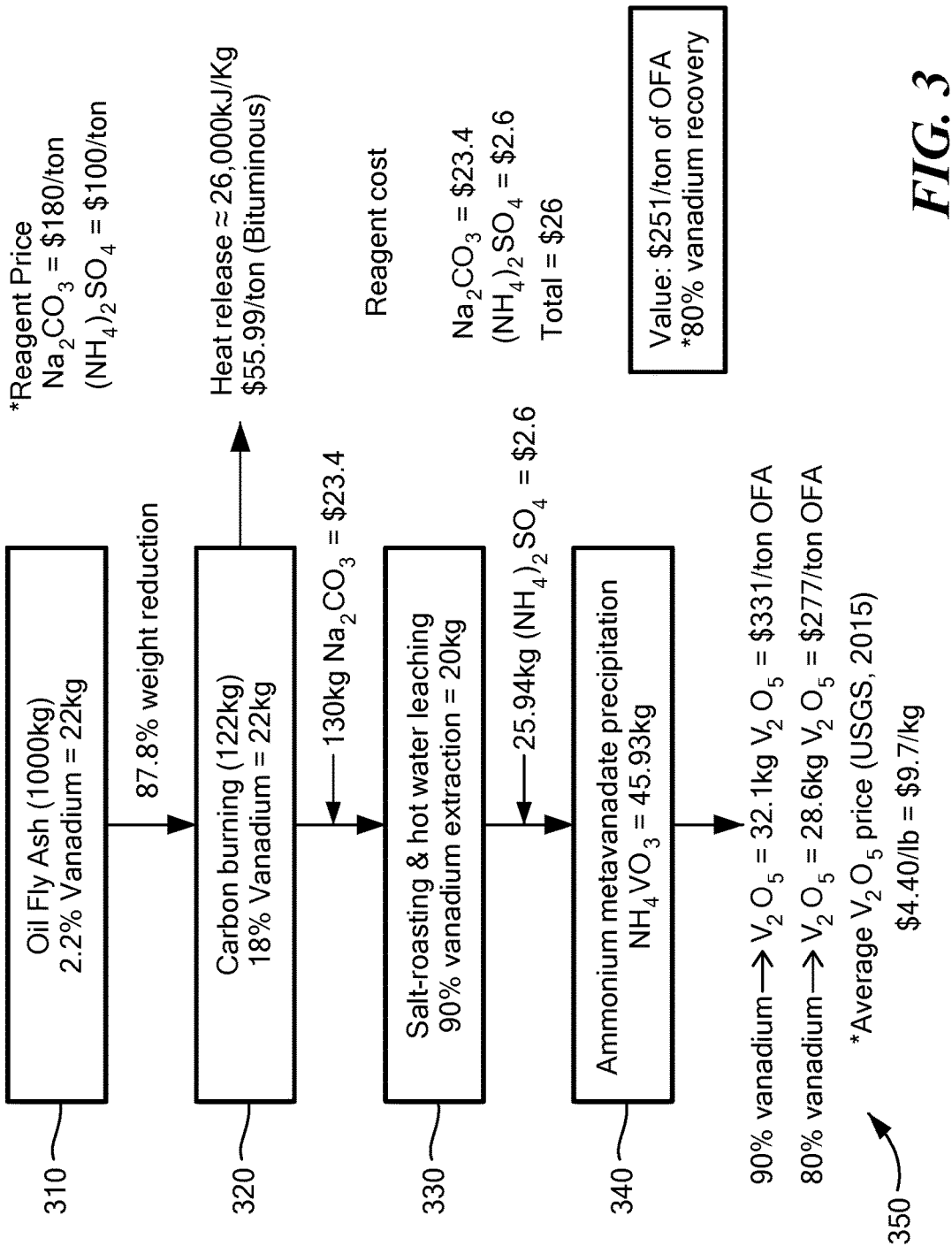
FIG. 3 is an example of recovery using a OFA sample according to the progression of FIG. 2.

FIG. 3 is an example of recovery using an OFA sample according to the progression of FIG. 2. The approach of FIG. 3 represents a particular configuration employed to illustrate the principles and advantages of the disclosed approach. Various alternatives may be apparent, such as variations in timing, temperature, volume, and substitution of materials and solvents, may be performed without departing from the claimed approach.

Referring to the sequence 300 of FIG. 3, following the gathering of OFA from electrical plant waste/byproduct elimination or disposal, a metric ton (1000 kg) has about 2.2%, or 22 kg of vanadium, as depicted at step 310. Following observation of the effect of carbon burning temperature on vanadium recovery, the example of FIG. 3 performs carbon burning at 650° C. for 2 hours to prevent melting of the roasted product, since the melting point of vanadium oxides starts from 690° C., shown at step 320. The combustion of carbon can also release 26,000 J/Kg for alternate uses, further enhancing the economic benefits of the disclosed approach.

130 kg of sodium carbonate is added at step 330 for salt roasting, which may be performed in the same heating vessel or furnace as the carbon burning. The effect of sodium carbonate concentration and roasting temperature on vanadium recovery has been considered. Since salt-roasting with sodium chloride generates hydrochloric acid gas which is highly corrosive, sodium carbonate is used as an alternative sodium salt. In higher temperature trials where the salt roasting temperature is 950° C., the roasted product is stuck to the surface of the crucible containing the product. However, when the roasting temperature is 650° C., which is the same temperature of carbon burning temperature, the roasted product is not stuck to the crucible surface.

Using the roasted product, hot water leaching is performed for 4 hrs at 60° C. Hot water leaching after salt roasting at 650° C. is effective at dissolving vanadium selectively from the oil fly ash, and achieves about 90% of vanadium extraction. Additionally, this leaching condition could separate iron and nickel; therefore, a solution purification step is not required for vanadium recovery. Various concentrations of sodium carbonate may be employed without substantially affecting the percentage of vanadium extraction. However, hot water leaching without the salt-roasting process will not achieve the same level of vanadium extraction since the water soluble vanadium product is produced by the salt-roasting process. By contrast, when the roasting temperature is increased from 650° C. to 950° C., the percentage of vanadium extraction is decreased from 92% to 36%.

The products remaining after the roasting are $NaVO_3$ and $Na_2V_2O_7$. In terms of solubility, both $NaVO_3$ and $Na_2V_2O_7$ are readily water soluble; therefore, vanadium can be separated from gangue materials by hot water leaching. After the roast-leach process, ammonium meta-vanadate can be precipitated from the leach solution, and the ammonium metavanadate can be converted to vanadium pentoxide by calcination. During precipitation, ammonium sulfate is added to precipitate the ammonium meta-vanadate, as depicted at step 340 Once ammonium metavanadate is precipitated, the precipitates are filtered, dried, and calcined to produce vanadium pentoxide based on the following reaction equations:

Precipitation: $2NaVO_3 + (NH_4)_2SO_4 = 2NH_4VO_3 + Na_2SO_4$

Calcination: $2NH_4VO_3 = V_2O_5 + 2NH_3 + H_2O$ $\Delta G° = -58.949$ at $900°$ C.

Generally, calcination employs thermal treatment process in the absence or limited supply of air or oxygen to bring about a thermal decomposition. The recovered vanadium oxide (vanadium pentoxide) represents at least 80% of the vanadium in the extracted material, as shown at step 350.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of extracting vanadium, comprising:
   extracting oil fly-ash from an industrial combustion process for burning oil;
   carbon burning the oil fly-ash in a heating vessel for impurity and carbon removal;
   salt roasting the oil fly-ash in the heating vessel;
   leaching the salt-roasted oil fly-ash to produce a vanadium leach solution;
   precipitating ammonium metavanadate from the vanadium leach solution; and
   calcining the precipitated ammonium metavanadate to yield recovered vanadium in the form of vanadium pentoxide, the recovered vanadium pentoxide representing at least 80% of the vanadium in the oil fly-ash.

2. The method of claim 1 wherein the salt roasting further comprises:
   adding sodium carbonate to the oil fly-ash following the carbon burning; and
   salt roasting the oil fly-ash with the sodium carbonate to generate a water-soluble leach product.

3. The method of claim 2 wherein the salt roasting forms water soluble vanadium products, further comprising leaching the salt roasted oil fly-ash with water ($H_2O$) to result in the vanadium leach solution.

4. The method of claim 3 wherein salt roasting results in at least $NaVO_3$.

5. The method of claim 1 wherein precipitating the ammonium metavanadate includes adding ammonium sulfate to the vanadium leach solution.

6. The method of claim 1 wherein the carbon burning occurs at 650 degrees C.

7. The method of claim 6 wherein the carbon burning and the salt roasting occur at the same temperature.

8. The method of claim 1 wherein carbon burning occurs between $650°$ and $690°$ C.

9. The method of claim 1 wherein carbon burning occurs below the melting point of vanadium oxides.

10. The method of claim 1 wherein the oil fly-ash has greater than 1% vanadium content by weight.

11. The method of claim 1 wherein the oil fly-ash has at least 2.2% vanadium content by weight.

\* \* \* \* \*